(12) United States Patent
Hanafusa

(10) Patent No.: US 8,567,813 B2
(45) Date of Patent: Oct. 29, 2013

(54) SADDLE-TYPE VEHICLE

(75) Inventor: Seiji Hanafusa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/554,644

(22) Filed: Jul. 20, 2012

(65) Prior Publication Data

US 2012/0280475 A1 Nov. 8, 2012

Related U.S. Application Data

(62) Division of application No. 12/766,690, filed on Apr. 23, 2010, now Pat. No. 8,424,902.

(30) Foreign Application Priority Data

Apr. 28, 2009 (JP) ................................. 2009-109220

(51) Int. Cl.
*B60R 21/16* (2006.01)
*B60R 21/20* (2011.01)

(52) U.S. Cl.
USPC .................................... 280/728.2; 280/730.1

(58) Field of Classification Search
USPC .......................................... 280/728.2, 730.1
See application file for complete search history.

(56) References Cited

U.S. PATENT DOCUMENTS

| | | | |
|---|---|---|---|
| 6,113,133 A * | 9/2000 | Iijima et al. ................. | 280/730.1 |
| 6,497,300 B2 * | 12/2002 | Mori et al. .................... | 180/219 |
| 6,848,709 B2 * | 2/2005 | Nagatsuyu .................. | 280/730.1 |
| 7,162,992 B2 * | 1/2007 | Kobayashi et al. ........ | 123/198 E |
| 7,458,436 B2 * | 12/2008 | Iwanaga ........................ | 180/227 |
| 7,497,464 B2 * | 3/2009 | Horiuchi et al. ........... | 280/730.1 |
| 7,556,283 B2 * | 7/2009 | Horiuchi et al. ........... | 280/728.2 |
| 7,740,272 B2 * | 6/2010 | Goto et al. .................... | 280/735 |
| 7,789,416 B2 * | 9/2010 | Horiuchi et al. ........... | 280/728.3 |
| 7,946,610 B2 * | 5/2011 | Misaki et al. ............... | 280/728.2 |
| 7,967,337 B2 * | 6/2011 | Misaki et al. ................ | 280/781 |
| 2007/0063491 A1 * | 3/2007 | Horiuchi et al. ........... | 280/728.2 |
| 2010/0207416 A1 * | 8/2010 | Inoue .............................. | 296/63 |

FOREIGN PATENT DOCUMENTS

JP 3685872 B2 8/2005

* cited by examiner

*Primary Examiner* — Ruth Ilan
*Assistant Examiner* — Joselynn Y Sliteris
(74) *Attorney, Agent, or Firm* — Birch, Stewart, Kolasch & Birch, LLP

(57) ABSTRACT

A saddle-type vehicle equipped with an airbag apparatus in which an increase in the number of component parts can be restrained. A motorcycle is a vehicle in which seat rails are included in a rear portion of a body frame with a rider seat having a front end portion upwardly inclined towards the front side of the vehicle that is mounted on the seat rails. An airbag module accommodating an airbag therein and fixed by an airbag mounting stay extending upwardly from the body frame and is disposed on the front side of the rider seat. A seat hook for holding the front end portion of the rider seat extends from the airbag module or from the airbag mounting stay.

5 Claims, 10 Drawing Sheets

SADDLE-TYPE VEHICLE

CROSS-REFERENCE TO RELATED APPLICATIONS

This application is a divisional of application Ser. No. 12/766,690, filed on Apr. 23, 2010 now U.S. Pat. No. 8,424,902, the entire contents incorporated herein by reference and for which priority is claimed under 35 U.S.C. §120.

The present application claims priority under 35 USC 119 to Japanese Patent Application No. 2009-109220 filed on Apr. 28, 2009 the entire contents of which are hereby incorporated by reference.

BACKGROUND OF THE INVENTION

1. Field of the Invention

The present invention relates to an improvement in a saddle-type vehicle equipped with an airbag apparatus.

2. Description of Background Art

A saddle-type vehicle equipped with an airbag apparatus is known wherein the airbag apparatus is positioned on the front side of a rider seat on which a rider or riders are to be seated. See, for example, Japanese Patent No. 3685872 (FIG. 3).

In FIG. 3 of Japanese Patent No. 3685872, a fuel tank 4 (the same reference symbols as those in the document are used here) is disposed at a front portion of a body frame 1 with a seat 5 being provided at a rear portion of the body frame 1 and an airbag module M is disposed at a position which is between the fuel tank 4 and the seat 5 (hereinafter referred to as "rider seat") which is proximate to the upper surface of the body frame 1. The airbag module M is mounted to the body frame 1 through a mounting stay 10 and a mounting piece 11.

In Japanese Patent No. 3685872, at the time of mounting to the body frame 1 the rider seat whose front end portion is upwardly inclined toward the front side of the vehicle, an independent support member may be additionally provided for supporting the front end portion of the rider seat. In such a case, it is necessary to provide the body frame with the support member for supporting the front end portion of the rider seat, leading to an increase in the number of component parts.

SUMMARY AND OBJECTS OF THE INVENTION

It is an object of an embodiment of the present invention to provide a saddle-type vehicle equipped with an airbag apparatus in which an increase in the number of component parts can be restrained.

According to an embodiment of the present invention, a saddle-type vehicle is provided that includes a body frame including seat rails in a rear portion thereof, a rider seat mounted on the seat rails with the rider seat having a front end portion upwardly inclined toward the front side of the vehicle. An airbag module accommodates an airbag therein with the airbag module being disposed on the front side of the rider seat and fixed by an airbag mounting stay extending upward from the body frame. A seat hook for holding the front end portion of the rider seat extends from the airbag module.

According to an embodiment of the present invention, in a saddle-type vehicle includes a body frame including seat rails in a rear portion thereof with a rider seat mounted on the seat rails. The rider seat has a front end portion upwardly inclined toward the front side of the vehicle, and an airbag module accommodating an airbag therein, the airbag module being disposed on the front side of the rider seat and fixed by an airbag mounting stay extending upward from the body frame. A seat hook for holding the front end portion of the rider seat extends from the airbag mounting stay.

According to an embodiment of the present invention, a fuel tank is disposed in a space ranging from the lower side of the airbag module to the lower side of the front end portion of the rider seat.

According to an embodiment of the present invention, at least one of the airbag module and the airbag mounting stay is provided with a cowl mounting stay to which a cowl for covering the body frame is mounted.

According to an embodiment of the present invention, at least one of the airbag module and the airbag mounting stay is provided with a pipe support part for supporting a fuel pipe.

According to an embodiment of the present invention, a pair of left and right main frames extend rearwardly from a head pipe with an upper surface of the fuel tank being disposed between the left and right main frames and being so formed as to be located above the left and right main frames. The airbag mounting stay extends from the left and right main frames to above the upper surface of the fuel tank.

According to an embodiment of the present invention, a seat hook for holding a front end portion of the rider seat extends from the airbag module. Since the rider seat having the front end portion upwardly inclined toward the front side of the vehicle can be held by the airbag module, an increase in the number of component parts can be restrained. With an increase in the number of component parts being restrained, the vehicle body can be simplified in structure.

According to an embodiment of the present invention, a seat hook for holding a front end portion of the rider seat extends from an airbag mounting stay. Since the rider seat can be held by the airbag mounting stay, an increase in the number of component parts can be restrained. With an increase in the number of component parts restrained, the vehicle body can be simplified in structure.

According to an embodiment of the present invention, the fuel tank is disposed in a space ranging from the lower side of the airbag module to the lower side of the front end portion of the rider seat. Even if other member than the body frame is disposed on the lower side of the airbag module and on the lower side of the rider seat, the airbag module and the rider seat can be supported.

According to an embodiment of the present invention, at least one of the airbag module and the airbag mounting stay is provided with a cowl mounting stay, so that not only the rider seat but also the cowl can be mounted to the airbag module and/or the airbag mounting stay. Accordingly, the number of component parts can be reduced, and the vehicle body can be simplified in structure.

According to an embodiment of the present invention, at least one of the airbag module and the airbag mounting stay is provided with a pipe support part, so that not only the rider seat but also a fuel pipe can be mounted. Accordingly, the number of component parts can be reduced, and the vehicle body can be simplified in structure.

According to an embodiment of the present invention, the upper surface of the fuel tank is formed so as to be located above a pair of left and right main frames, and the airbag mounting stay extends from the left and right main frames to above the upper surface of the fuel tank. With such an airbag mounting stay, it is possible to dispose the airbag module in an optimum position, for example, to dispose the airbag module close to the rider.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
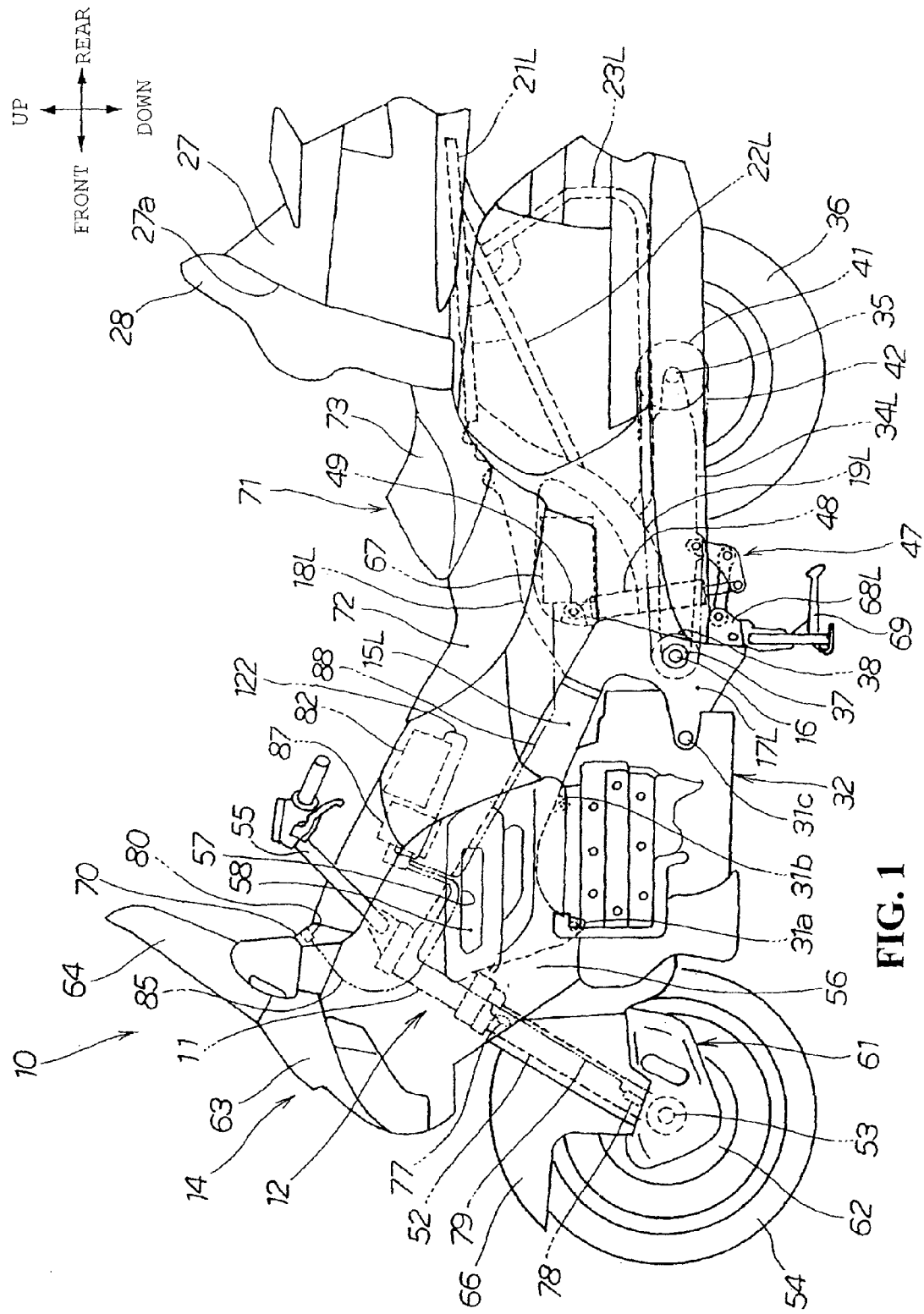
FIG. 1 is a left side view of a motorcycle pertaining to the present invention.

Embodiments of the present invention will be described in detail below. In the drawings and the embodiments, the directions "up," "down," "front," "rear," "left," and "right" refer to the directions as viewed from a driver seated on the motorcycle. In addition, the drawings are to be viewed according to the posture of reference symbols.

As illustrated in FIG. 1, a motorcycle 10 is a saddle-type vehicle that includes a head pipe 11, and a body frame 12 extending rearward from the head pipe 11.

The body frame 12 includes, as major components, a pair of main frames 15L and 15R (only reference symbol 15L on the viewer's side is shown) extend rearwardly from the head pipe 11 which constitutes a front portion of a vehicle body 14 with a pair of left and right pivot plates 17L and 17R (only reference symbol 17L on the viewer's side is shown) mounted to rear end portions of the main frames 15L and 15R and having a pivot shaft 16. A pair of left and right seat rails 18L and 18R (only reference symbol 18L on the viewer's side is shown) rise rearwardly and upwardly from upper portions of the pivot plates 17L and 17R and then extend rearwardly. A pair of left and right middle frames 19L and 19R (only reference symbol 19L on the viewer's side is shown) interconnect rear end portions of the seat rails 18L and 18R and intermediate portions of the pivot plates 17L and 17R and support the seat rails 18L and 18R. In short, the seat rails 18L and 18R are included in a rear portion of the body frame 12.

A pair of left and right sub-rails 21L and 21R (only reference 21L on the viewer's side is shown) extend rearwardly from upper end portions of the middle frames 19L and 19R. A pair of left and right seat stays 22L and 22R interconnect rear portions of the sub-rails 21L and 21R and the middle frames 19L and 19R, respectively. A pair of left and right auxiliary stays 23L and 23R (only reference symbol 23L on the viewer's side is shown) extend rearwardly and downwardly from rear portions of the sub-rails 21L and 21R and then extend horizontally toward the front side.

A trunk 27 for accommodating objects therein is mounted to the sub-rails 21L and 21R, and a back rest 28 for holding the rider's back is mounted to a front wall 27a of the trunk 27.

An engine 32 is suspended under the main frames 15L and 15R through fastening members 31a to 31c. The engine 32 is a horizontally opposed six-cylinder water-cooled engine.

A pair of left and right rear swing arms 34L and 34R (only reference symbol 34L on the viewer's side is shown) which can be vertically swung about the pivot shaft 16 are mounted to the pivot plates 17L and 17R. A rear wheel 36 is rotatably mounted to rear end portions of the rear swing arms 34L and 34R through a rear axle 35. The rear wheel 36 is driven by a chain 42 which is wrapped around a drive sprocket 38 attached to a drive shaft 37 of the engine 32 and a driven sprocket 41 formed to be integral with the rear wheel 36.

A rear shock absorber 48 is risingly mounted to intermediate portions of the rear swing arms 34L and 34R through a link mechanism 47. An upper end portion of the rear shock absorber 48 is mounted to a bracket 49 formed on the side of the main frames 15L and 15R.

A front fork 52 is steerably mounted to the head pipe 11. A front wheel 54 is mounted to the front fork 52 through a front axle 53. A steering handle 55 is attached to an upper end portion of the front fork 52. The head pipe 11 is a member for turnably supporting the steering handle 55.

An opening part 57 is formed on a lateral side of front portions of the main frames 15L and 15R and on a lateral side of a main cowl 56. A radiator unit 58 for cooling the engine 32 is disposed so as to face the opening part 57.

In FIG. 1, a front disk brake unit 61 is provided together with a front disk plate 62, a front cowl 63 for covering the front side of the vehicle, a front shield 64, a front fender 66, a pair of left and right main stand brackets 68L and 68R (only reference symbol 68L on the viewer's side is shown), a battery 67 disposed under a rider seat 71, a main stand 69 and 70 denotes a meter or meters 70.

The rider seat 71 on which the riders are to be seated is provided on the seat rails 18L and 18R. The rider seat 71 has a structure in which a resin-made front seat 72 permits the rider to be seated thereon and a rear seat 73 is provided in continuity with a rear portion of the front seat 72 that are integrally disposed on the upper side of a seat bottom plate.

Figure 2:
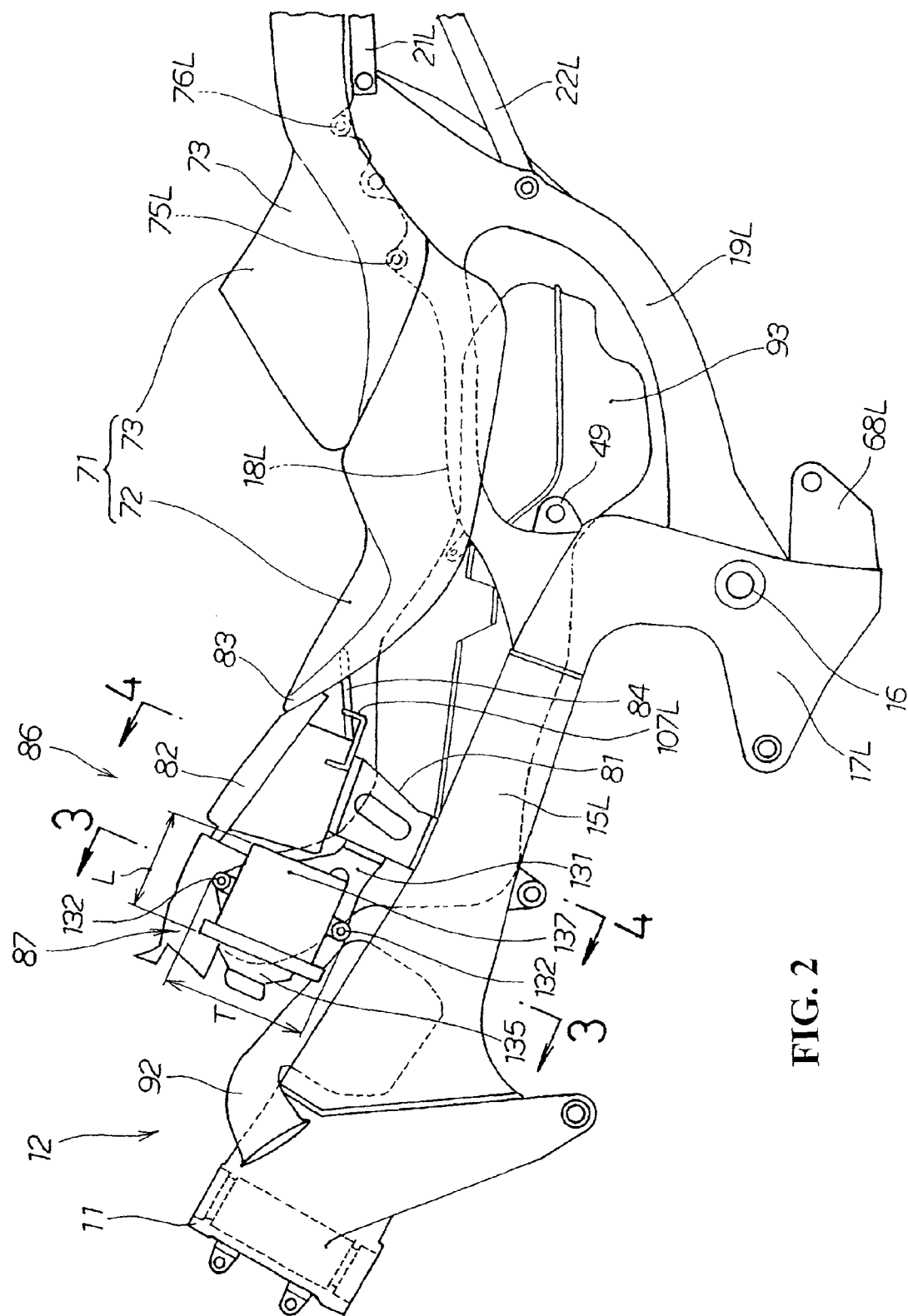
FIG. 2 is a left side view of showing a condition where a rider seat and an airbag apparatus are mounted to the motorcycle pertaining to the invention.

In FIG. 2, of the rider seat 71 on which the riders are to be seated, a rear end portion of the seat bottom plate is attached to the seat rails 18L and 18R through pairs of left and right fastening bolts 75L, 75R, 76L and 76R.

An airbag module 82 is mounted to the main frames 15L and 15R through an airbag mounting stay 81. A seat hook 84 for holding a front end portion 83 of the bottom plate of the rider seat 71 extends rearwardly from the airbag module 82. In other words, the airbag module 82 is fixed to the airbag mounting stay 81 provided as a stay extending upwardly from the body frame 12.

The airbag module 82 is one of components of an airbag apparatus 86. The airbag apparatus 86 includes, as major components, the airbag module 82, and an airbag control unit 87 for controlling the deployment of an airbag (reference symbol 101 in FIG. 4, described later) which is accommodated in the airbag module 82.

Summing up the foregoing, the rider seat 71 is mounted on and attached to the seat rails 18L and 18R in the condition in which the front end portion 83 of the seat bottom plate is upwardly inclined toward the front side of the vehicle. The airbag module 82 is disposed on the front side of the rider seat 71.

Referring to FIG. 1, left and right first sensors 77, 77 (only reference symbol 77 on the viewer's side is shown) and left and right second sensors 78, 78 (only reference symbol 78 on the viewer's side is shown) for detecting an impact on the vehicle body 14 are disposed respectively at an upper portion and a lower portion of the front fork 52. First cables 79, 79 (only reference symbol 79 on the viewer's side is shown) extend from the upper and lower sensors 77, 77, 78, 78, and are passed on the upper side of the engine 32, to be connected to the airbag control unit 87. The meter or meters 70 include an indicator 80 for displaying whether the airbag apparatus 86 is in a normal state or an abnormal state. A second cable 85 extends from the indicator 80, and is connected to the airbag control unit 87. In addition, a third cable 88 extends from a battery 67, and is passed on the lower side of the rider seat 71, to be connected to the airbag control unit 87.

Figure 3:
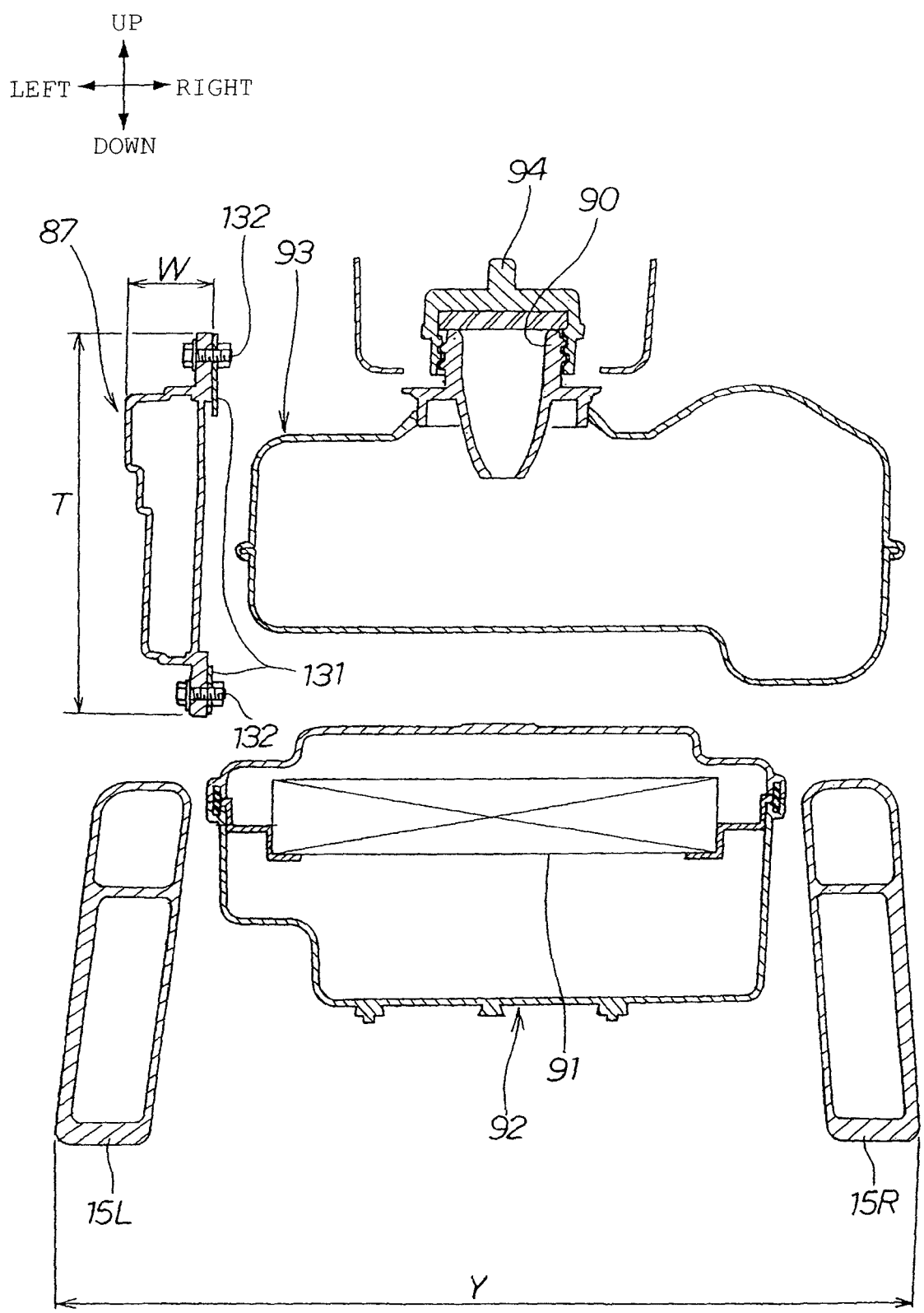
FIG. 3 is a sectional view taken along line 3-3 of FIG. 2.

In FIG. 3, an air cleaner unit 92 with an element 91 incorporated therein is disposed between the left and right main frames 15L and 15R, and a fuel tank 93 is disposed on the upper side of the air cleaner unit 92. The airbag control unit 87 is disposed on the left side of the fuel tank 93 and on the inner side in the vehicle width direction relative to the overall width (Y) of the left and right main frames 15L and 15R. In FIG. 3, an oil filler cap 94 is provided which openably covers an oil filler port 90 provided at an upper front portion of the fuel tank 83.

Since the airbag control unit 87 is disposed along a lateral side of the fuel tank 93, the increase in the vehicle width due to the arrangement of the airbag control unit 87 can be minimized.

In addition, since the airbag control unit 87 is disposed on the inner side in the vehicle width direction relative to the left and right main frames 15L and 15R, the shape of the cowl (reference symbol 106 in FIG. 9, described later) can be set compact and freely, as compared with the case where the airbag control unit 87 is disposed to exceed the outer width of the main frames 15L and 15R.

Figure 4:
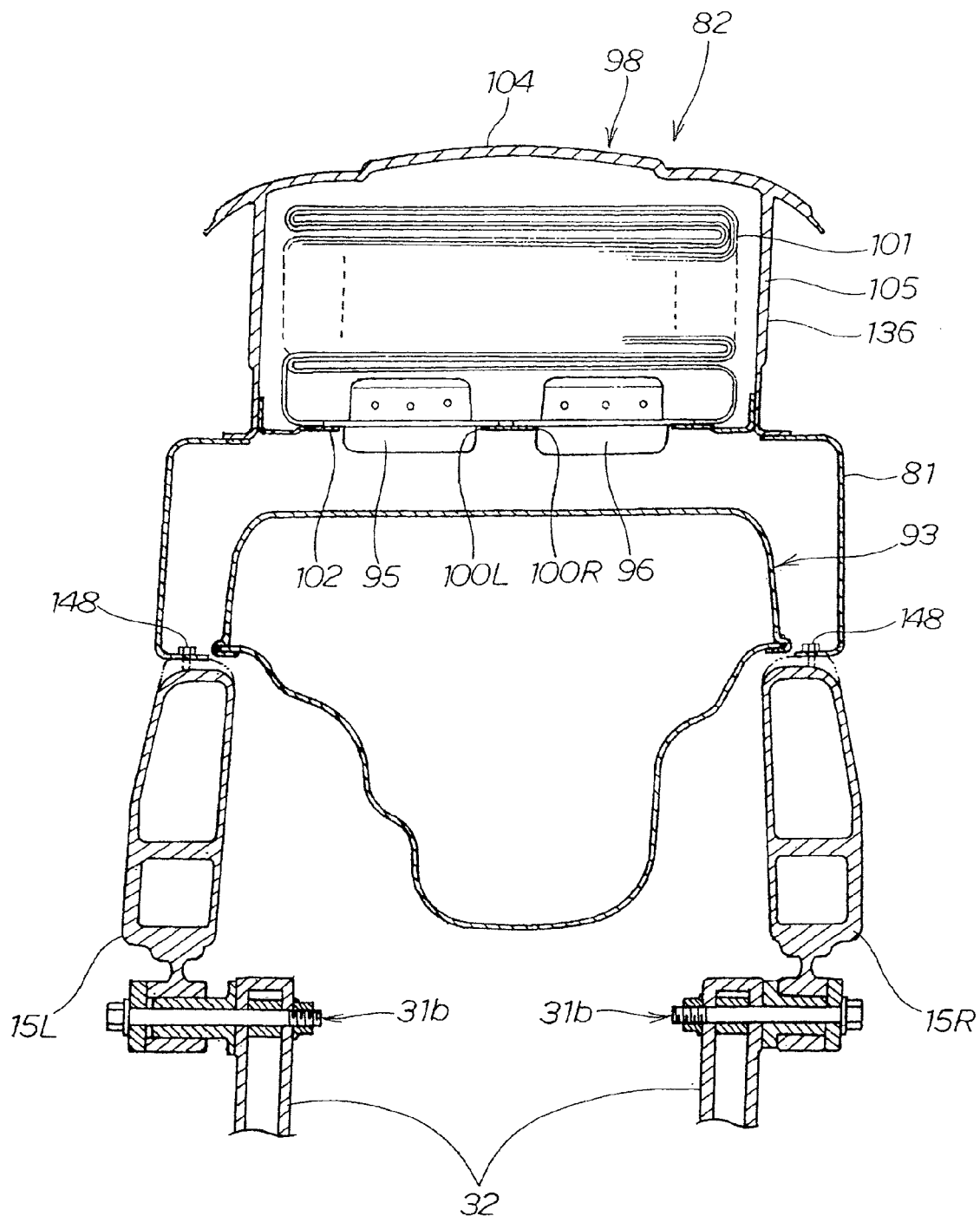
FIG. 4 is a sectional view taken along line 4-4 of FIG. 3.
Figure 5:
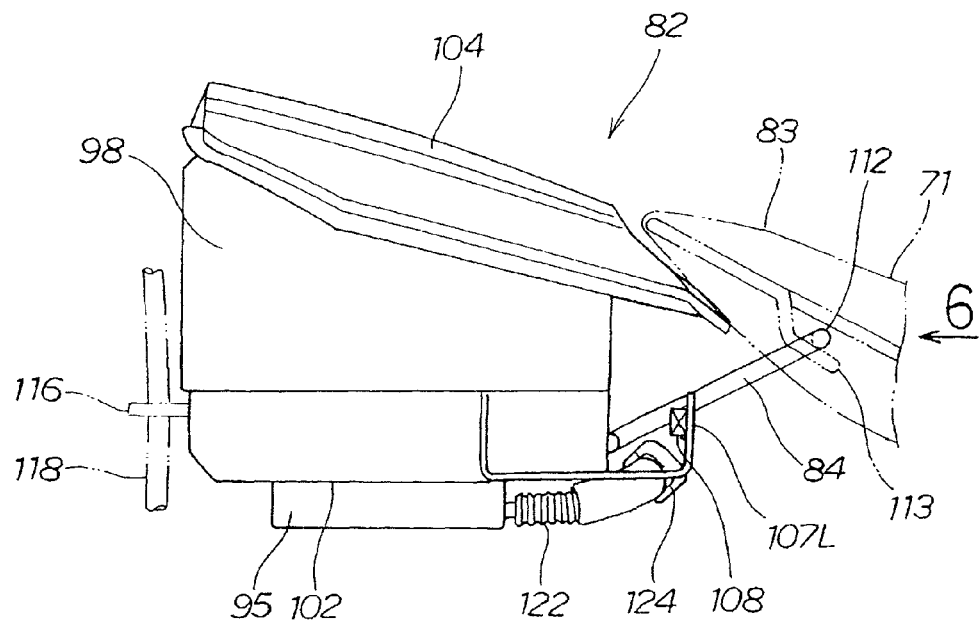
FIG. 5 is a side view for illustrating the relationship between a seat hook extended from an airbag module pertaining to the invention and the rider seat.
Figure 6:
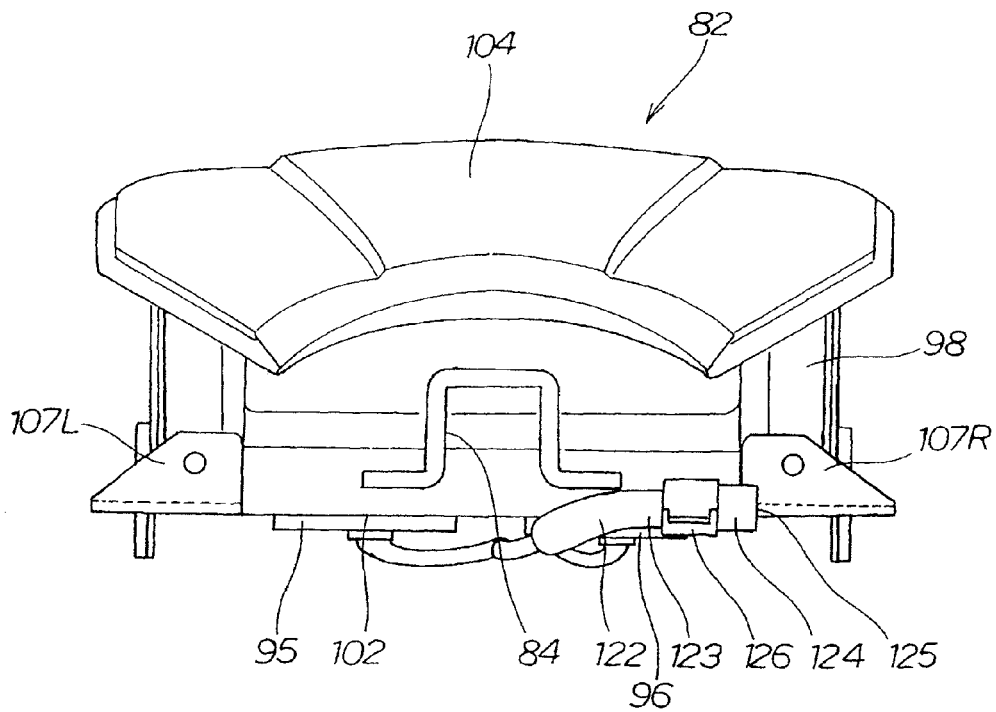
FIG. 6 is a view taken along arrow 6 of FIG. 5.
Figure 7:
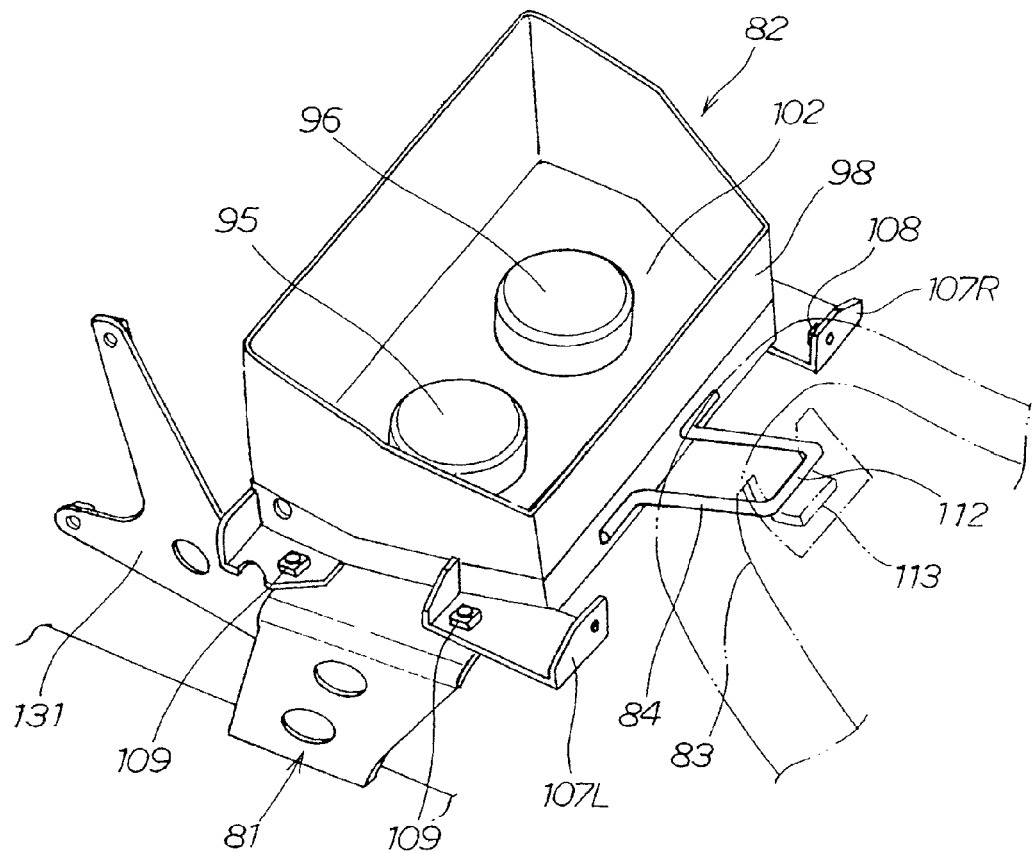
FIG. 7 is a perspective view for illustrating the relationship between the seat hook extended from the airbag module pertaining to the invention and the rider seat.

In FIG. 4, the fuel tank 93 is disposed between the left and right main frames 15L and 15R. Left and right inflators 95 and 96 for generating a gas for inflating the airbag 101 and the airbag module 82 accommodating the airbag 101 therein are disposed on the upper side of the fuel tank 93. In short, the airbag module 82 accommodates the airbag 101 therein.

The airbag module 82 has a holding box 98 as a casing. The holding box 98 is composed of a bottom plate 102, side plates 105 provided erectly on the bottom plate 102, and a lid 104 for covering the upper side of the side plates 105.

The bottom plate 102 of the holding box 98 is provided with opening parts 100L and 100R, and the inflators 95 and 96 arranged in parallel on the left and right sides are provided so as to penetrate the opening parts 100L and 100R, respectively.

In addition, while the two inflators 95 and 96 are arranged in parallel on the left and right sides, the number of the inflators may be arbitrary, and the inflators may be arranged in parallel on the front and rear sides. Thus, the arrangement of the inflators is not limited to the form of layout according to this embodiment.

Now, the layout of the airbag control unit 87 will be described below.

In FIGS. 2 to 4, the airbag module 82 is disposed on the front side of the rider seat 71, and the airbag control unit 87 is disposed at a position which is between the head pipe 11 and the airbag module 82 and which is deviated to the left side from the center line passing through the center of the vehicle width.

In addition, the airbag control unit may be disposed at a position deviated to the right side from the center line passing through the center of the vehicle width.

The airbag control unit 87 is a member having a box-like shape of which the length (L) along the longitudinal direction of the vehicle is greater than the width (W) along the vehicle width direction, and the height (T) along the vehicle height direction is greater than the width (W) along the vehicle width direction.

Thus, the airbag control unit 87 is a box-like member having a width (W) which is smaller than each of the length (L) and the height (T). Since the airbag control unit 87 having the width (W) smaller than each of the length (L) and the height (T) is disposed along the vehicle width direction, an increase of the vehicle size in the vehicle width direction can be restrained.

Now, the layout of the fuel tank will be described below.

The fuel tank 93 is disposed in a space ranging from the lower side of the airbag module 82 to the lower side of the front end portion 83 of the rider seat 71. Such a layout of the fuel tank 93 ensures that the airbag module 82 and the rider seat 71 can be supported, even in the case where other member than the body frame 12 is disposed on the lower side of the airbag module 82 and the lower side of the rider seat 71.

In FIGS. 5 to 8, the airbag module 82 has the holding box 98 accommodating the inflators 95 and 96 therein. A lid 104 as a cover having a fragile portion (not shown) at part thereof so that the airbag (reference symbol 101 in FIG. 4) can be inflated and deployed is provided at an upper portion of the holding box 98. The seat hook 84 for holding the front end portion 83 of the rider seat 71 extends rearwardly from the holding box 98. Separately from the seat hook 84, cowl mounting stays 107L and 107R to which a cowl 106 for covering the body frame 12 is to be mounted extend rearwardly from the holding box 98. Weld nuts 108, 108 are provided for mounting the cowl 106 together with fastening members 109 . . . ( . . . indicates plurality, here and hereafter) for fixing the airbag module 82 to the airbag mounting stay 81. Screw members 110, 110 are provided for mounting the cowl 106.

The seat hook 84 has a U-shaped part 112 which is substantially U-shaped in a plan view. A holding piece 113 extends downwardly from the front end portion 83 of the rider seat bottom plate and then extends rearwardly and is hooked on the U-shaped part 112 from above, the front end portion 83 of the rider seat bottom plate is held onto the seat hook 84.

Further, the holding box 98 of the airbag module 82 is provided with a pipe support part 116. Since the pipe support part 116 is thus provided, not only the rider seat 71 but also a fuel pipe 118 can be mounted to the airbag module 82.

In addition, the pipe support part is not limited to the one for supporting the fuel pipe; for example, the pipe support part may be one for supporting cables such as harnesses.

Since the airbag module 82 is provided with the seat hook 84, the cowl mounting stays 107L and 107R, and the pipe support part 116, it is possible to reduce the number of component parts and to make the vehicle body simple in structure.

In addition, the pipe support part 116 may be provided in the airbag mounting stay 81.

Referring to FIG. 2 as well, an extension stay 131 extends forward from the airbag mounting stay 81, and the airbag control unit 87 is mounted to the extension stay 131 by fastening members 132, 132. Since the extension stay 131 functions also as a mounting member for the airbag control unit 87 and extends from the airbag mounting stay 81. Thus, there is no fear that the number of component parts would be increased.

Figure 8:
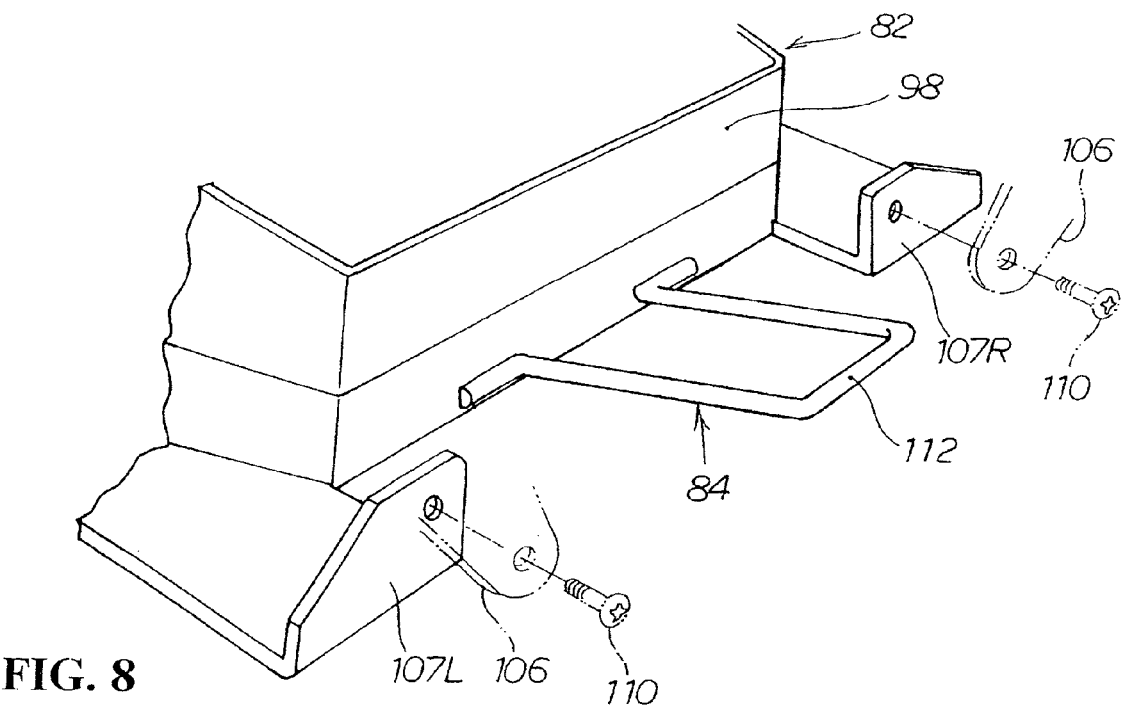
FIG. 8 is a perspective view of a cowl mounting stay extended from the airbag module pertaining to the invention.
Figure 9:
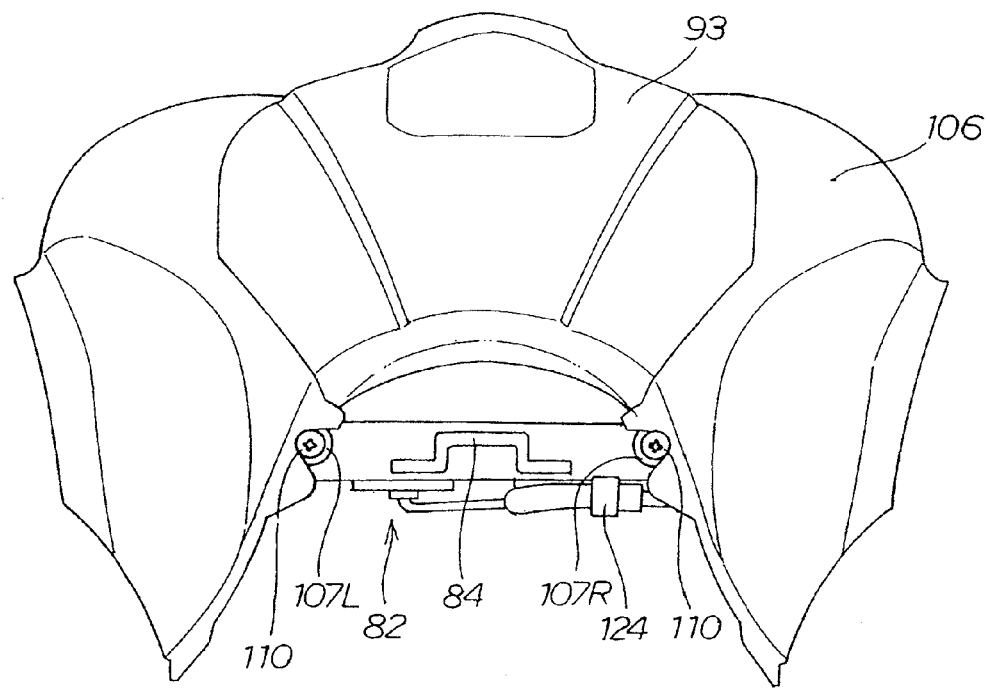
FIG. 9 is a back view for illustrating that a cowl can be mounted to the cowl mounting stay extended from the airbag module pertaining to the invention.

In FIGS. 8 and 9, on the left and right outer sides of the seat hook 84 for supporting the front end portion 83 of the rider seat bottom plate, the cowl mounting stays 107L and 107R extend rearwardly from the airbag module 82. With the structure in which the rider seat 71 can be held by the seat hook 84 and the cowl 106 can be mounted by the cowl mounting stays 107L and 107R, it is possible to restrain an increase in the number of component parts. With an increase in the number of component parts thus restrained, the vehicle body can be simplified in structure.

Summing up the foregoing, the airbag module 82 is provided with the cowl mounting stays 107L and 107R for the cowl 106 for covering the body frame 12, so that not only the rider seat 71 but also the cowl 106 can be mounted. Accordingly, the number of component parts can be reduced, and the vehicle body can be simplified in structure.

In addition, the airbag mounting stay 81 may be provided with the cowl mounting stays 107L and 107R. Further, both the airbag module 82 and the airbag mounting stay 81 may be provided with the cowl mounting stays 107L, 107R.

Figure 10:
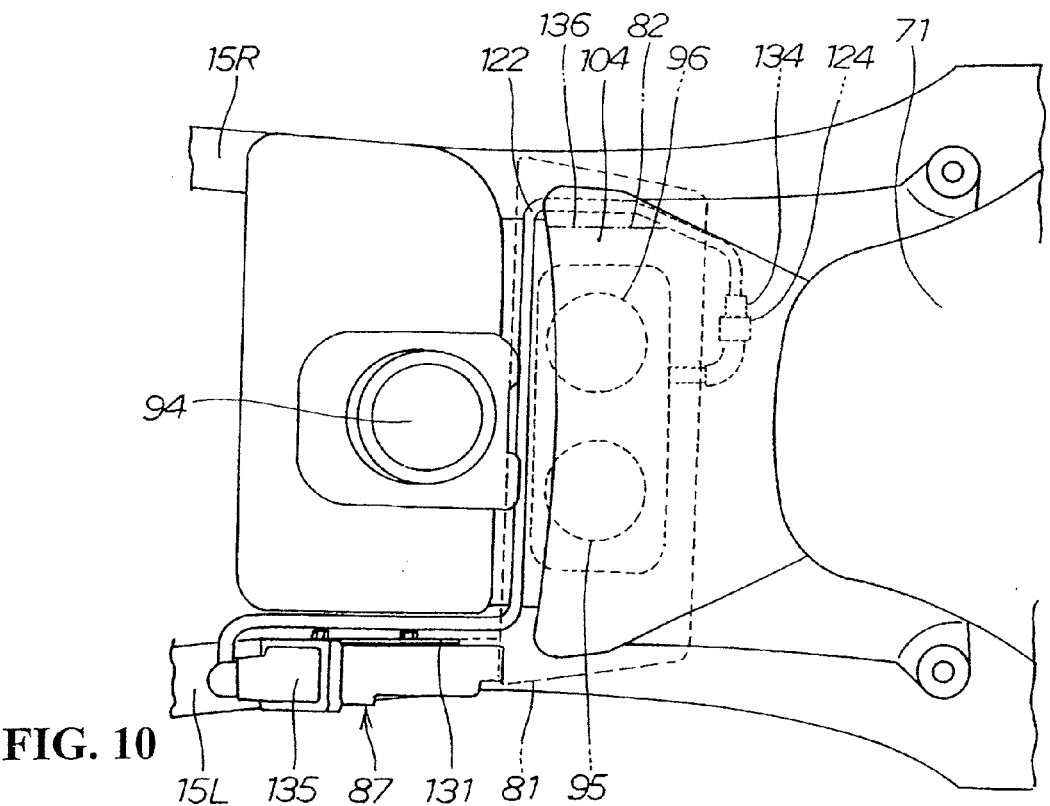
FIG. 10 is a plan view for illustrating the laying-around of a wiring which interconnects the airbag module pertaining to the invention and an airbag control unit.

In FIG. 10, a wiring 122 for transmitting a deployment control signal for the airbag 101 is provided between the airbag control unit 87 and the airbag module 82. The wiring 122 extends from a front portion 135 of the airbag control unit 87, is passed on the front side of the airbag module 82, and is passed on the outer side of a right side surface 136 of the airbag module 82 on which the airbag control unit 87 is not disposed. The wiring 122 is then passed between the airbag module 82 and the rider seat 71, to be connected to the airbag module 82. More specifically, the wiring 122 is provided with a wiring connector part 134 at a leading end portion thereof, and the wiring connector part 134 is connected to a connector part 124 on the module side.

Thus, the airbag apparatus 86 has the airbag control unit 87 for controlling the deployment of the airbag 101. The wiring 122 for transmitting the deployment control signal for the airbag 101 is provided between the airbag control unit 87 and the inflators 95, 96.

The wiring 122 for interconnecting the airbag control unit 87 and the airbag module 82 extends from the front portion 135 of the airbag control unit 87, and is passed on a lateral side of the airbag module 82, to be connected to the airbag module 82. According to such a laying of wiring, a worker can easily carry out wiring works by putting a hand or hands into a required site from a lateral side of the airbag module 82. Accordingly, workability relating to wiring can be enhanced.

Now, the operation of the above-mentioned saddle-type vehicle will be described below.

Figure 11:
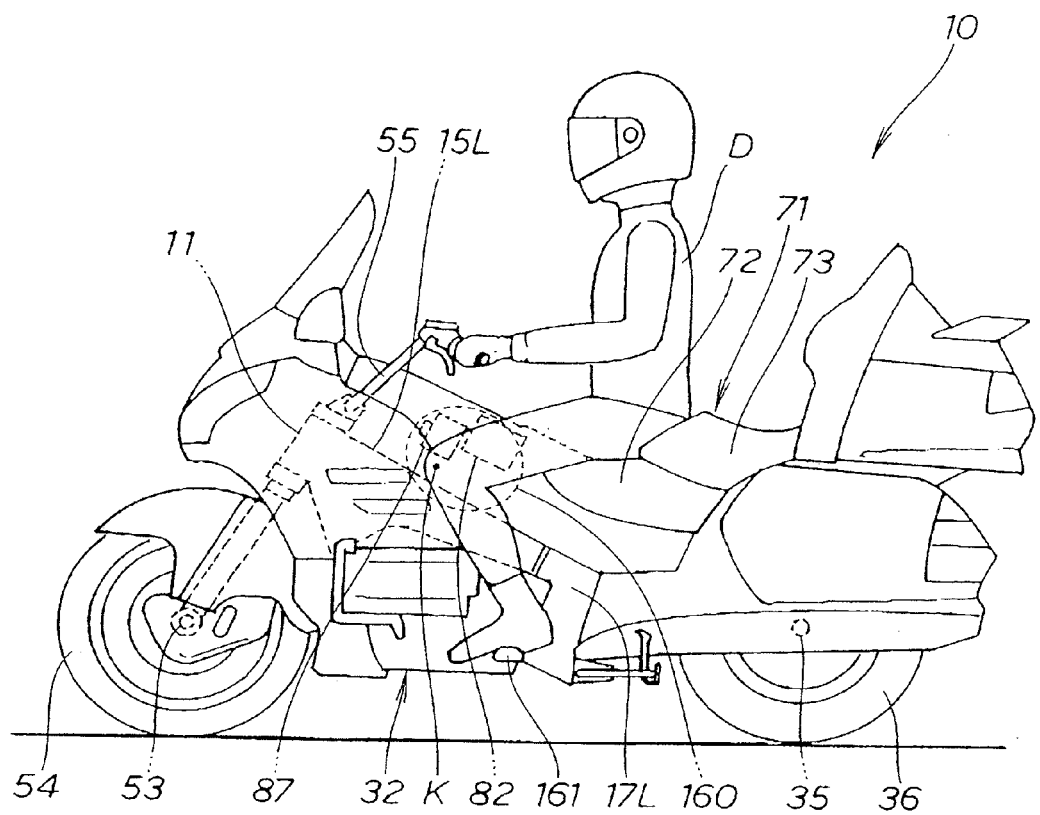
FIG. 11 illustrates operation of a motorcycle having an airbag apparatus pertaining to the invention.

In FIG. 11, the airbag control unit 87 is disposed between the head pipe 11 and the airbag module 82 in side view of the vehicle.

If the airbag control unit 87 is disposed, for example, on the left side of the airbag module 82 in the case where the space between the left and right main frames 15L and 15R is set to be narrow, there is a possibility that the airbag control unit 87 may protrude to the outside of the left main frame 15L, resulting in an enlargement of the vehicle width.

In this connection, according to the present invention, the airbag control unit 87 is disposed between the head pipe 11 and the airbag module 82.

Where the airbag control unit 87 is thus disposed between the head pipe 11 and the airbag module 82, the vehicle width can be restrained from being enlarged. In this case, the lateral side of the air bag module 82 and the lateral side of the airbag control unit 87 are both in an area 160 of contact by the knee K of the driver D. With the vehicle width restrained from being enlarged in this area 160, gripping of the vehicle body by the knees K of the driver D can be performed easily.

In FIG. 11, rider steps 161, 161 (only reference symbol 161 on the viewer's side is shown) are provided at lower portions of the pivot plates 17L and 17R and on which the feet of the driver D are positioned.

Referring to FIGS. 2 to 4, the upper surface of the fuel tank 93 is formed so as to be located above the pair of left and right main frames 15L and 15R, and the airbag mounting stay 81 extends from the left and right main frames 15L and 15R to above the upper surface of the fuel tank 93. With such an airbag mounting stay 81, it is possible to dispose the airbag module 82 at an optimum position, for example, to dispose the airbag module 82 close to the rider.

In addition to this, the fuel tank 93 is disposed in a space ranging from the lower side to the front side of the airbag module 82; a front portion of the fuel tank 93 is bulged to the upper side on the front side of the airbag module 82 and is provided with an oil filler port 90; and the airbag control unit 87 is disposed on a lateral side of the oil filler port 90. Consequently, the airbag module 82, the fuel tank 93, the oil filler port 90 and the airbag control unit 87 can be disposed in a limited space on the front side of the rider seat 71, so that an effective utilization of space is achieved. In addition, even with such a layout, a reduction in the capacity of the fuel tank 93 can be obviated.

Figure 12:
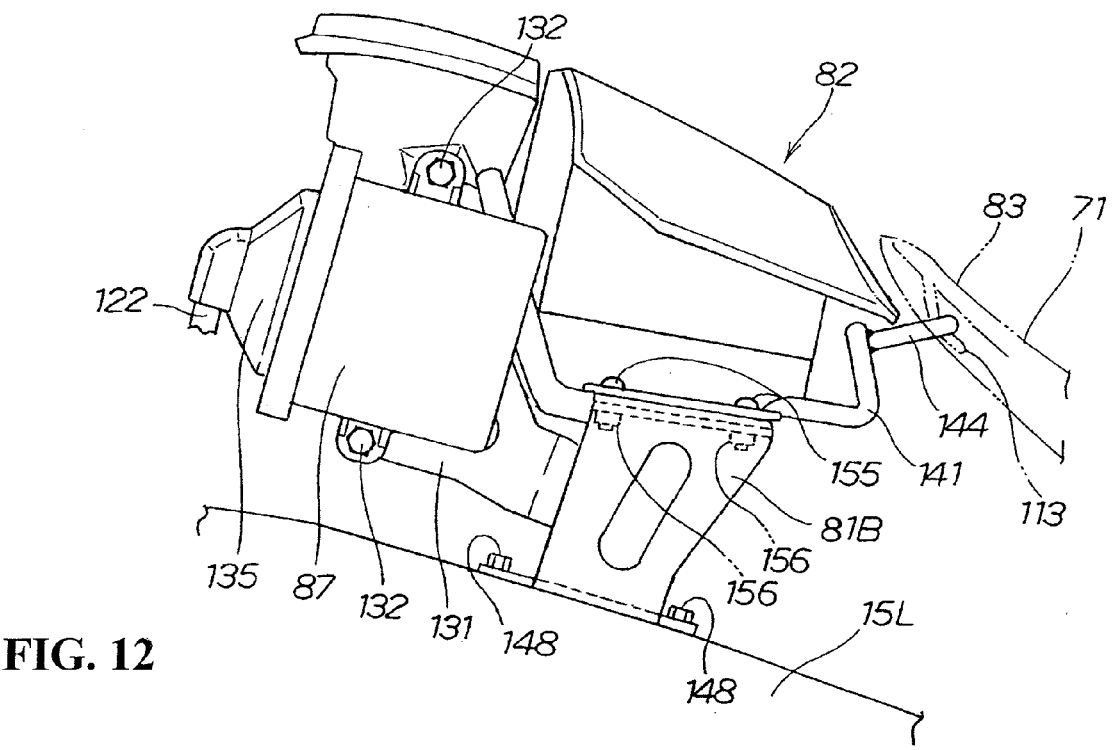
FIG. 12 illustrates another embodiment of FIG. 5.
Figure 13:
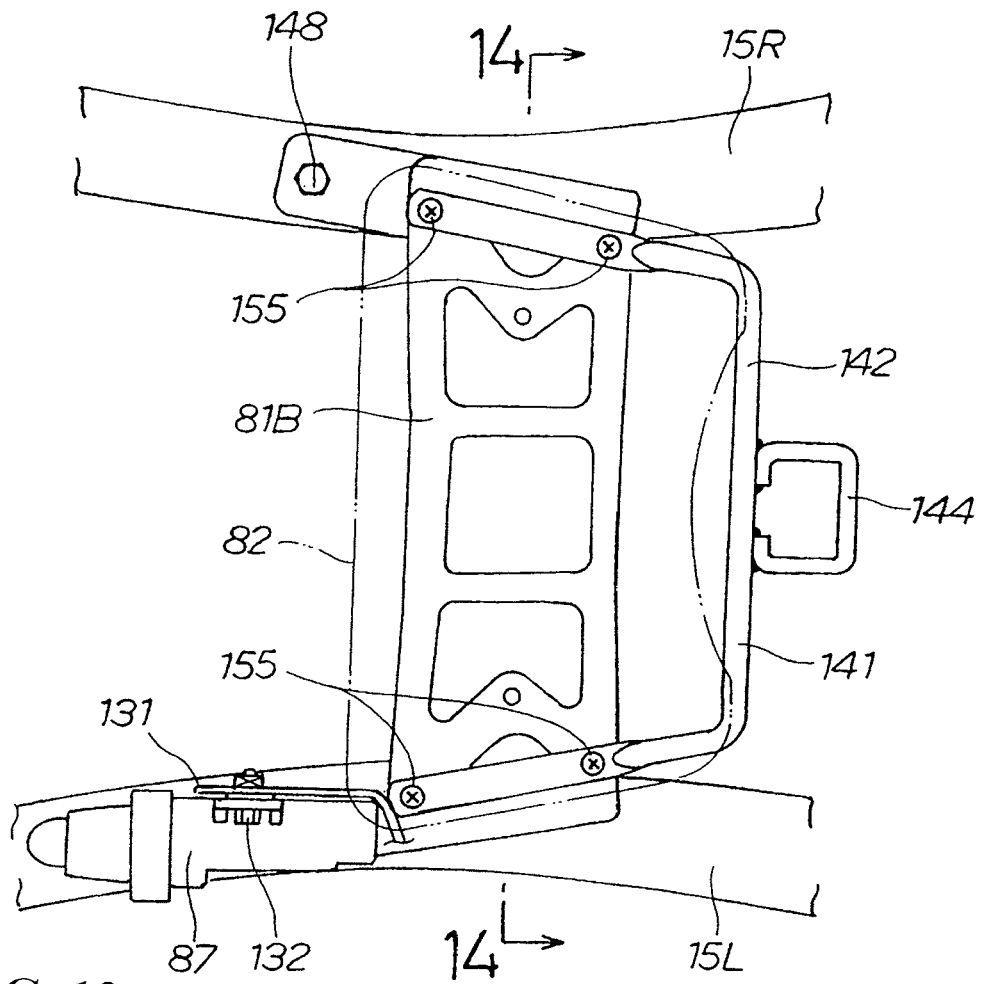
FIG. 13 is a plan view of the seat hook extended from the airbag mounting stay according to the invention.

In FIGS. 12 and 13, a seat hook arm 141 substantially U-shaped in plan view extends from an airbag mounting stay 81B provided as a stay for mounting an airbag module 82 to main frames 15L and 15R. A seat hook 144 which is substantially C-shaped in plan view and which holds a front end portion 83 of a rider seat bottom plate is mounted to extend from a transverse arm part 142 of the seat hook arm 141. In addition, the seat hook arm 141 is mounted to the airbag mounting stay 81B by bolts 155 . . . .

In FIGS. 12 and 13, bolts 148 . . . are provided for firmly attaching the airbag mounting stay 81B to the main frames 15L, 15R. In addition, the airbag mounting stay 81B may be attached to the main frames 15L, 15R by welding.

Figure 14:
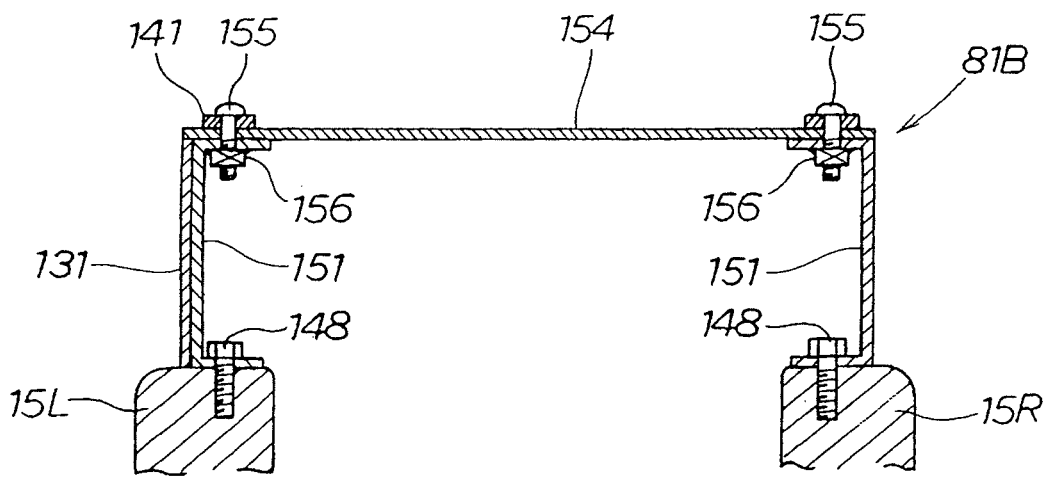
FIG. 14 is a sectional view taken along line 14-14 of FIG. 13.

In FIG. 14, the airbag mounting stay 81B is composed of a combination of left and right longitudinal plates 151, 151, which are angular U-shaped in section, with a transverse plate 154 provided bridgingly between upper end portions of the left and right longitudinal plates 151, 151. The seat hook arm 141 is mounted on the overlapping portions of the longitudinal plates 151, 151 and the transverse plate 154, and they are mounted by co-fastening by means of bolts 155" and nuts 156 . . . .

Figure 15:
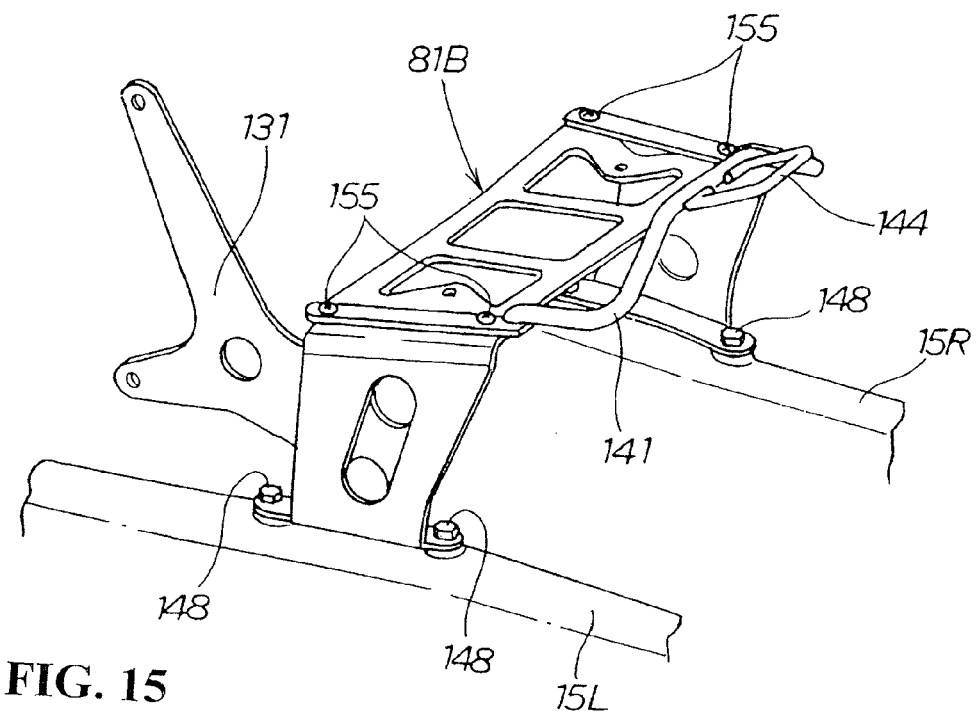
FIG. 15 is a perspective view of the seat hook extended from the airbag mounting stay pertaining to the invention.

In FIG. 15, a seat hook 144 for holding a front end portion 83 of a rider seat bottom plate is extended from the airbag mounting stay 81B. Since the rider seat 71 can be held by the airbag mounting stay 81B, an increase in the number of component parts can be restrained. With an increase in the number of component parts thus restrained, the vehicle body can be simplified in structure.

Figure 16:
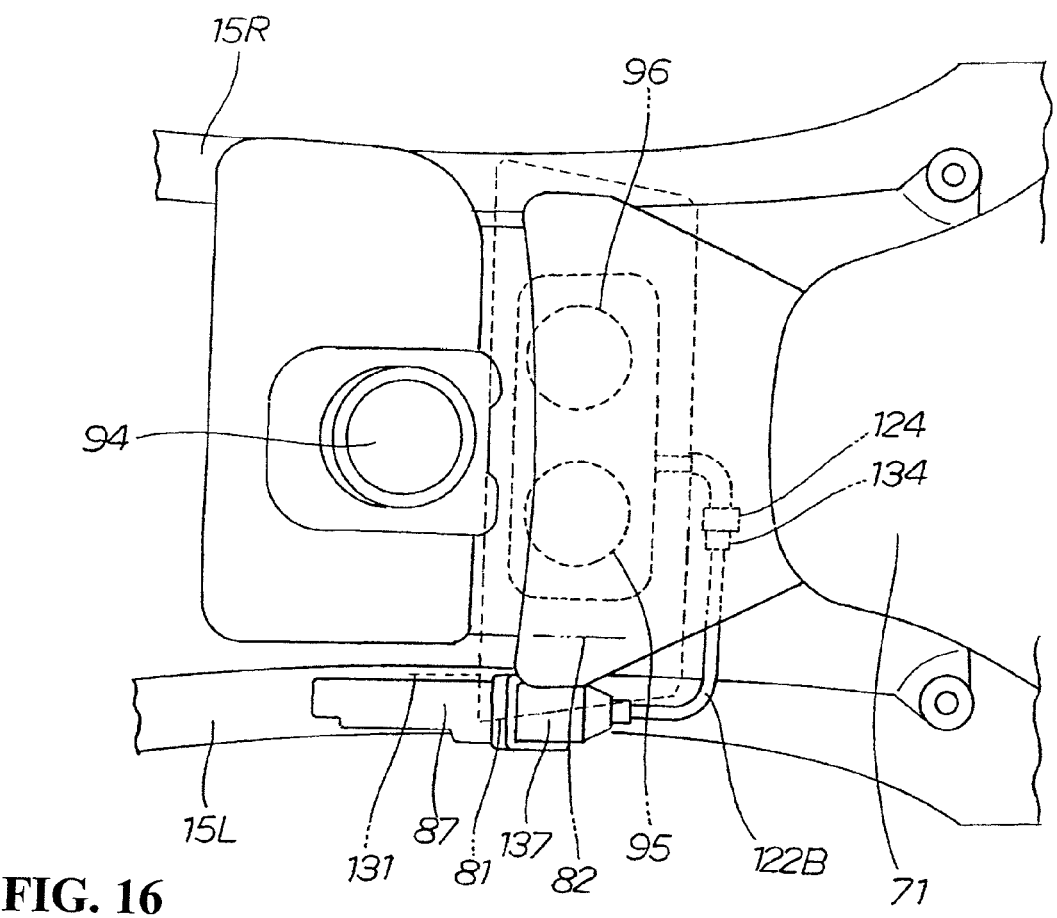
FIG. 16 is a view of another embodiment of FIG. 10.

In FIG. 16, a wiring 122B for transmitting a deployment control signal for an airbag (reference symbol 101 in FIG. 4) is provided between an airbag control unit 87 and the airbag module 82. The wiring 122B extends from a rear portion 137 of the airbag control unit 87, and is passed between the airbag module 82 and the rider seat 71, to be connected to the airbag module 82.

Since the wiring 122B for interconnecting the airbag control unit 87 and the airbag module 82 extends from the rear portion 137 of the airbag control unit 87 and is connected to the airbag module 82, the wiring 122B can be laid to extend to the airbag module 82 through a shortest distance.

In addition, while the present invention is applied to a saddle-type vehicle in the embodiments above, the invention can be applied also to three-wheel vehicles, and may be applied to general vehicles.

The present invention is preferable for application to a motorcycle equipped with an airbag apparatus.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle vehicle, comprising:
    a body frame including seat rails in a rear portion thereof;
    a rider seat mounted on the seat rails, the rider seat having a front end portion upwardly inclined toward a front side of the vehicle;
    an airbag module accommodating an airbag therein, the airbag module being disposed adjacent to the front end portion of the rider seat and fixed by an airbag mounting stay extending upwardly from the body frame; and
    a cowl mounting stay to which a cowl for covering the body frame is mounted, the cowl mounting stay being directly mounted on the airbag mounting stay,
    wherein a seat hook for holding the front end portion of the rider seat extends from the airbag mounting stay.

2. The saddle vehicle according to claim 1, wherein a fuel tank is disposed in a space ranging from a lower side of the airbag module to a lower side of the front end portion of the rider seat.

3. The saddle vehicle according to claim 2, wherein a pair of left and right main frames extend rearwardly from a head pipe, an upper surface of the fuel tank disposed between the left and right main frames is formed so as to be located above the left and right main frames, and the airbag mounting stay extends from the left and right main frames to above the upper surface of the fuel tank.

4. The saddle vehicle according to claim 1, wherein at least one of the airbag module and the airbag mounting stay is provided with a pipe support part for supporting a fuel pipe.

5. The saddle vehicle according to claim 1, wherein the seat hook projects rearwardly towards the rider seat.

* * * * *